Oct. 10, 1967 G. E. BRADFORD 3,346,698

ISOLATING ARRANGEMENT FOR GATING CIRCUIT

Filed Jan. 15, 1964 3 Sheets-Sheet 1

INVENTOR

Guy E. Bradford

BY Stevens, Davis, Miller & Mosher

ATTORNEYS

Oct. 10, 1967 G. E. BRADFORD 3,346,698

ISOLATING ARRANGEMENT FOR GATING CIRCUIT

Filed Jan. 15, 1964 3 Sheets-Sheet 2

INVENTOR
Guy E. Bradford

BY Stevens, Davis, Miller & Mosher
ATTORNEYS

Oct. 10, 1967 G. E. BRADFORD 3,346,698
ISOLATING ARRANGEMENT FOR GATING CIRCUIT
Filed Jan. 15, 1964 3 Sheets-Sheet 3

INVENTOR
Guy E. Bradford
BY
Stevens, Davis, Miller & Mosher
ATTORNEYS

United States Patent Office 3,346,698
Patented Oct. 10, 1967

3,346,698
ISOLATING ARRANGEMENT FOR GATING CIRCUIT

Guy E. Bradford, Fort Lauderdale, Fla., assignor to Systems Engineering Laboratories, Incorporated, Fort Lauderdale, Fla., a corporation of Florida
Filed Jan. 15, 1964, Ser. No. 337,876
9 Claims. (Cl. 179—15)

ABSTRACT OF THE DISCLOSURE

The invention relates to a gating circuit for a multiplexer system in which a plurality of inputs are connected to a common output and in which the isolation feature of same constitutes blocking the gate drive from the output. This is accomplished through the use of one type of transistor, such as PNP, for the gating circuit and incorporating in the drive circuit for the gating transistors, transistors of the opposite type NPN. The gating transistors are reverse connected with the emitter acting as the collector, and the collector acting as the emitter. The drive for the gating transistors is a transformer. When the gating circuit is driven by the drive transformer, the output signal will follow the input signal and be chopped at the same frequency as the drive signal wiring across the transformer. Any voltage of positive polarity tending to pass through the PN (emitter-base) diode junction of the gating transistors will be blocked by the NPN configuration of the isloating transistors. Thus, the output voltage will be isolated from and prevented from changing the distributed capacitances of untriggered channels.

This invention relates to a transistor gating circuit, and more particularly to a switching isolation circuit. In multiplexer systems and more specifically in precise analog multiplexers, a plurality of single pole, single throw switches are connected to a common line, each switch electrically activated in sequence at a unique time, to produce an output signal, which is a time sequence of the analog inputs.

An object of this invention is to provide a single pole, single throw switch which is isolated from a driving control circuit.

Another object of the invention is to provide an electronic switch the operation of which is not delayed due to capacitive reactances found within the trigger circuit.

Another object of the invention is to provide an electronic switch which is substantially isolated from its control input transformer.

Another object of the invention is to isolate capacitances from a common output circuit.

Further and other objects of the invention will become apparent with the following detailed description of the invention, taken with respect to the appended drawings, in which.

Figure 1:
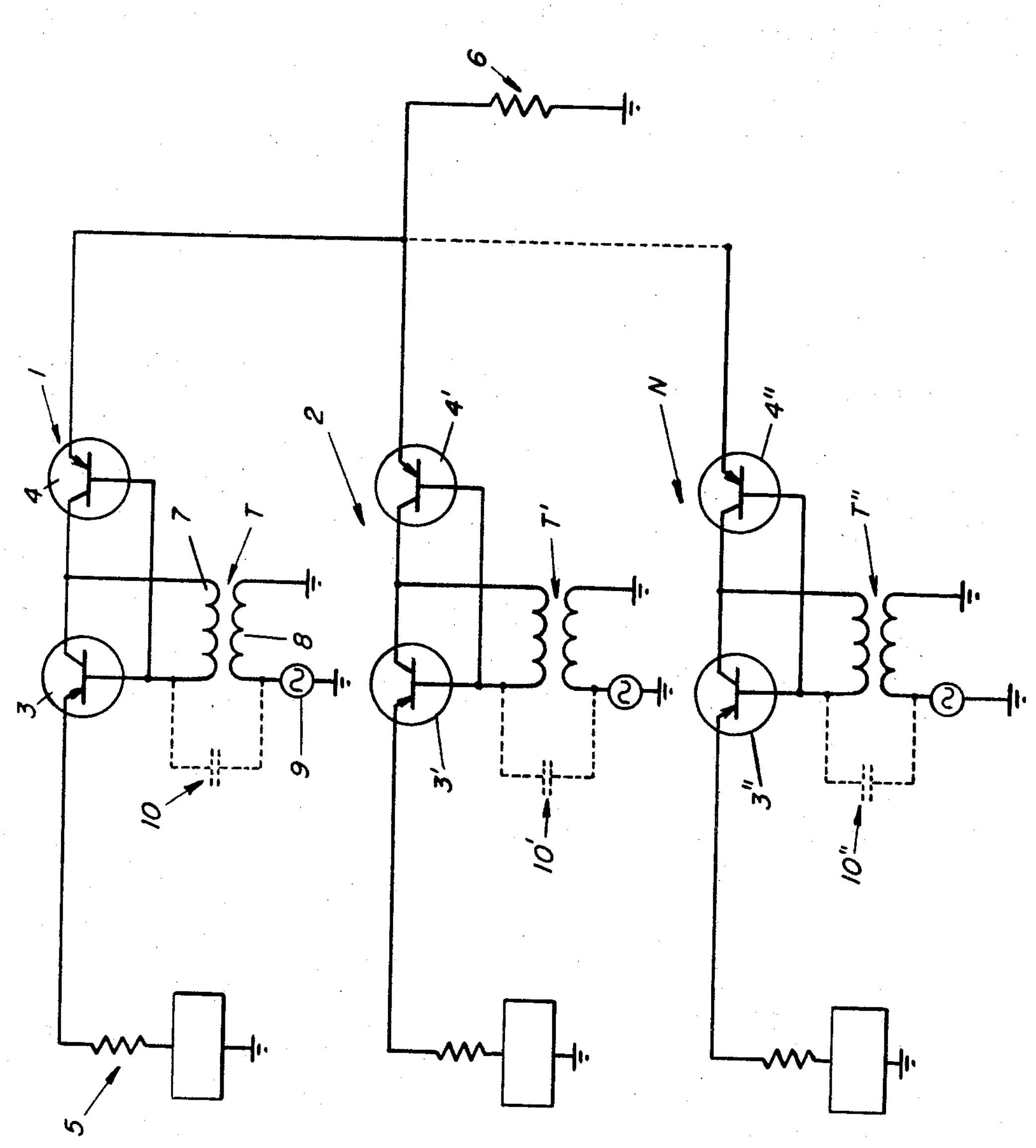
FIGURE 1 shows a schematic representation of a circuit which illustrates the switching problem.

Referring now to FIGURE 1 there is shown three parallel branches of a multiplex unit, each containing a set of series switches 1, 2 . . . and N. The series switches comprise, in this figure, two PNP transistors 3 and 4 having their collectors and bases connected together. Transistors 3 and 4 are operated in the "reverse" connection with their emitter and collector interchanged because of the anticipated use of the device in low-level voltage systems. Beta and the saturation voltage are low which allows proper operation without matching transistors 3 and 4. The input or emitter of transistor 3 is connected to its respective input source 5. The output of transistor 4 is connected to the output of the multiplexer and across the load resistor 6. The secondary winding 7 of the drive transformer T is connected across the bases and collectors of transistors 3 and 4. The related primary winding 8 of said transformer T is connected to any suitable time operated AC voltage source 9. The inherent capacitance of said transformer T is represented by the dotted capacitor 10.

In operation, source 9, which may be a square wave or pulse generator if a chopped output is desired, is energized when it is desired to sense the signal of the input source 5 by closing transistor switches 3 and 4 to communicate the voltage representation of source 5 to the output and across load resistor 6 of the multiplex unit. However, the effective switching time of transistors 3 and 4 is reduced by the inherent capacitance of drive transformers. Thus, when source 9 is energized to trigger the transistors 3 and 4, if the input 5 is at a positive voltage level, capacitors 10′ and 10″ must be charged since they are not isolated from the input signal. As the positive voltage is felt across the common load resistor 6, said positive voltage is also fed back through the untriggered channels 2 and N. Before the full value of the positive voltage can be established across resistor 6, all the distributed capacitors 10′, 10″ must be charged by the single channel input source 5 through the PN (emitter-base) diode junction of transistors 4′, 4″. Thus, it can be seen that the sum of the distributed capacitors causes delay in the response of the multiplexer and hence limits the number of channels that can be associated with a common load.

Figure 2:
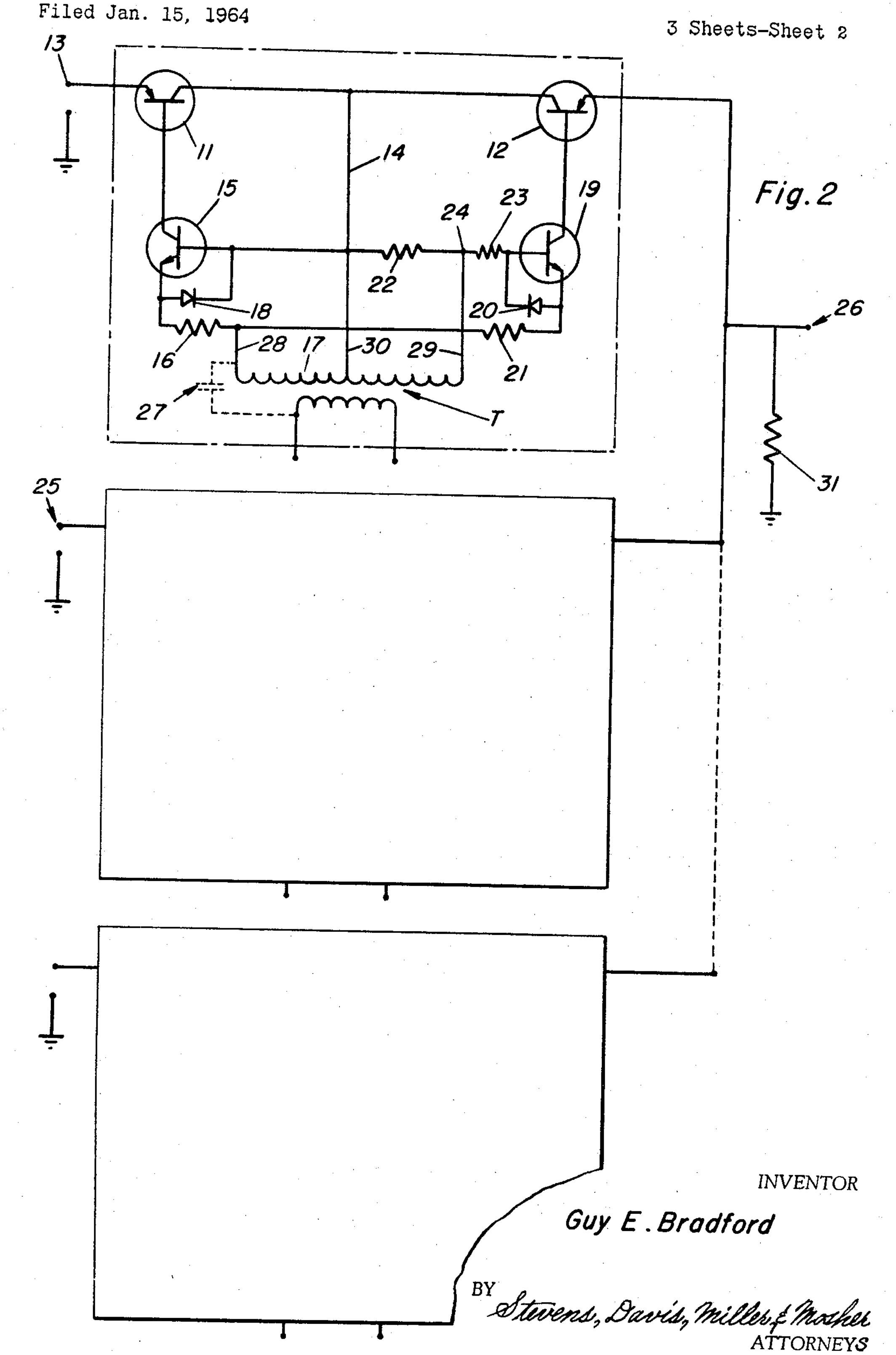
FIGURE 2 shows a preferred embodiment of the present invention.

The slow switching characteristics of transistors 3 and 4 are overcome by the isolated switching arrangement of the transistors 11 and 12, as disclosed by the present invention, shown in FIGURE 2. In that embodiment the input 13 feeds the emitter of transistor 11. The collector of transistor 11 is connected to the collector of transistor 12, and both said collectors are connected by lead 14 to the center tap of transformer T. The base of transistor 11 is connected to the collector of transistor 15, which is of opposite polarity from transistor 11, in this case an NPN transistor. The emitter of transistor 15 is connected through resistor 16 to one side of the secondary winding 17 of transformer T. Diode 18 is connected between the emitter and base of said transistor 15, and poled with its cathode connected to the base and anode connected to an NPN transistor 19 which has its base and emitter shunted by diode 20 similarly poled as diode 18. Transistor 19 also has its emitter connected through a resistor 21 to the same point on winding 17 as the emitter of transistor 15. Resistors 22 and 23 are connected in series between the bases of transistors 15 and 19, and the opposite tap of transformer T is connected to the junction 24 between resistors 22 and 23. Capacitor 27 represents the inherent distributed capacitance found in transformer T.

Similar legs are connected in parallel with the one shown in detail and connect their respective inputs such as 25 to the output 26 of the multiplex system.

The operation of the system shown in FIGURE 2 will now be described. When, at the proper time, it is desired to test the voltage status at input 13, an alternating square or pulse-signal is impressed across the primary winding of drive transformer T. When the voltage across the secondary winding of transformer T is such that tap 28 is more positive than tap 29, current will flow through resistor 16, diode 18, resistor 22, and back to tap 29. Current will also flow through resistor 21, diode 20, resistor 23, and back to tap 29. Since transistors 15 and 19 are both NPN type transistors, said transistors were not turned "on" and therefore transistors switches 11 and 12 were not triggered.

However, when terminal 28 of transformer T is more negative with respect to terminal 29 of the secondary windings thereof, both diodes 18 and 20 will assume a back bias condition, and the relatively negative signal appearing on tap 28 will pass through transistors 15 and 19, and be felt on the bases of transistors 11 and 12. A voltage which is relatively positive with respect to tap 28 appears on terminal 30 of the secondary winding of transformer T, and is thereby conveyed to the collectors of transistors 11 and 12 by lead 14. Hence, transistors 11 and 12 would be conditioned to be switched to their "on" state and pass the signal appearing at 13 therethrough to the output 26 of the multiplex unit. Hence, there results an output signal which follows the input signal and which is chopped at the frequency of the drive signal appearing across transformer T.

Let it now be assumed that transformer T' has been driven to examine the voltage status of input 25 and that said input voltage at 25 is positive. As the positive voltage appears at output 26, said positive voltage is also fed to all the other untriggered channels and felt on the emitters of the last switch transistor 12. As described above, the positive voltage tends to pass through the PN (emitter-base) diode junction of transistor 12; however, said positive voltage is blocked due to the NPN configuration of the isolating-drive transistor 19. Thus, the output voltage is isolated from and is prevented from charging the distributed capacitances 27 of the untriggered channels. Therefore, a multiplex using the present invention can incorporate more multiplex channels and have an overall faster response time than has heretofore been experienced in the art.

Isolating-drive transistor 15 functions similarly to transistor 19 when transistor 11 is connected to a common load and transistor 12 is connected to an input or when symmetrical operation is desired and there is no assigned input or output to the channel.

Although only one parallel leg of the multiplex unit has been described in detail, it is pointed out that all the other legs thereof operate in the same manner and a detailed discussion thereof is not considered necessary.

Figure 3:
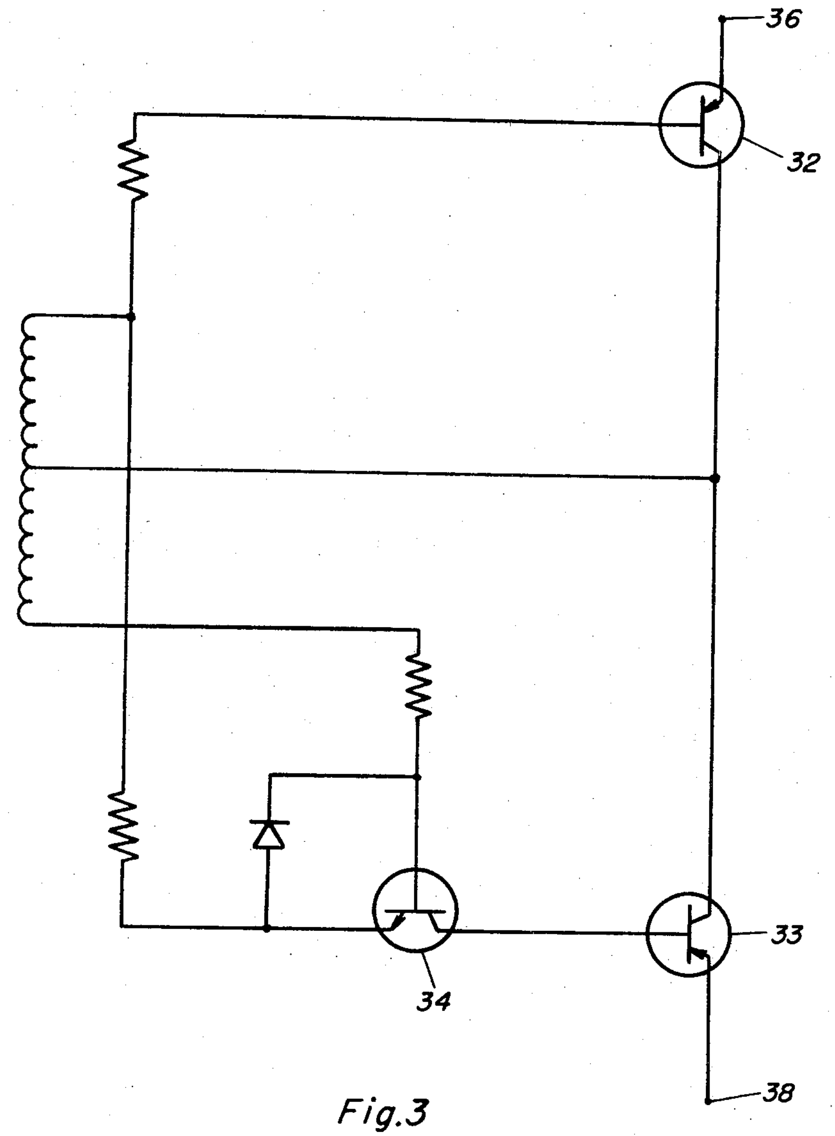
FIGURE 3 shows a simplified version of FIGURE 2.

FIGURE 3 shows a simplified version of FIGURE 2. The basic operation of transistors 32 and 33 is the same as that shown in FIGURE 2. Transistor 34 isolates the PN (emitter-base) diode junction of transistor 33 from the drive transformer in the same manner as described above, thus preventing the necessity of charging the entire distributed capacitance of the drive transformer of untriggered channels and thus increasing the response time of the multiplexer. In this embodiment, the output and input are assigned, and terminal 36 should be connected to the input and terminal 38 should be connected to the output or common load.

There has been shown a novel and advantageous drive and isolation circuit for transistor gates of a multiplex unit. It can therefore be seen that only the inherent line capacitance, which is extremely small, need be charged to have the input voltage appearing at input appear at the output across the common load resistor. The large distributed transformer capacitance of the channels need not be charged, and therefore a long delay time from switching to resulting output need not be experienced with the above described invention. Although the gating transistors are indicated to be PNP type transistors and the trigger transistors to be of the NPN type, it would be obvious to reverse all polarities thereof depending on the expected polarity of the input signal.

It is to be understood that the system described herein is by way of example only, and that the invention should only be limited by the scope of the appended claims. It is to be further understood that the gating circuit herein described has general utility and need not be limited in use to a multiplex system.

What is claimed is:

1. A gating circuit comprising input means, output means, switch means connected between said input and output means, drive means for feeding a switch control signal to said switch means, isolating means connected between said drive means and said switch means for conveying the control signal from said drive means to said switch means and isolating said drive means from said output means, said switch means comprising at least two first transistors of the same polarity having collectors and emitters connected in series with said input and output means and having bases connected to said isolating means, said isolating means comprising at least two second transistors of opposite polarity from said first transistors.

2. The gating circuit as set forth in claim 1, wherein said drive means comprises a transformer having primary and secondary windings.

3. The gating circuit as set forth in claim 2 further comprising means for signal bypassing said isolating means when the voltage across said secondary winding is of opposite polarity from that needed to close said switch means.

4. The gating means as set forth in claim 2, said secondary winding having two terminal taps and a center tap, said center tap being connected to said collectors of said first transistors and said terminal taps being connected to said isolating means.

5. A gating circuit comprising input means, output means, switch means connected between said input and output means, drive means for feeding a switch control signal to said switch means, isolating means connected between said drive means and said switch means for conveying the control signal from said drive means to said switch means and isolating said drive means from said output means, said switch means comprising two series connected transistors of like polarity having their emitters and collectors connected between said input and output means, said isolating means comprising one transistor of opposite polarity connected to the base of one of said series transistors, the other of said series transistors having its base connected to said drive means.

6. A multiplex system comprising a plurality of input means, a common output means, a signal channel connecting each input means to said common output means, said channel comprising switch means connected between said input and output means, drive means for feeding a switch control signal to said switch means, isolating means connected between said drive means and said switch means for conveying the control signal from said drive means to said switch means and isolating said drive means from all the other channels and from said output means, said switch means comprising at least two first transistors of the same polarity having collectors and emitters connected in series with said input and output means and having bases connected to said isolating means, said isolating means comprising at least two second transistors of opposite polarity from said first transistors.

7. A multiplex system as set forth in claim 6, wherein said drive means comprises a transformer having primary and secondary windings, and said signal channels further comprising means for bypassing said isolating means when the voltage across said secondary winding is of opposite polarity from that needed to close said switch means.

8. A multiplex system comprising a plurality of input means, a common output means, a signal channel connecting each input means to said common output means, said channel comprising switch means connected between said input and output means, drive means for feeding a switch control signal to said switch means, isolating means connected between said drive means and said switch means for conveying the control signal from said drive means to said switch means and isolating said drive means from all the other channels and from said output means, said switch means comprising two series connected transistors of like polarity having their emitters and collectors connected between said input and output means, said isolating means comprising one transistor of opposite polarity connected to the base of one of said series transistors, the other of said series transistors having its base connected to said drive means.

9. A multiplex system as set forth in claim 8, said signal channel further comprising means for signal bypassing said isolating means when the voltage at said drive means is of opposite polarity from that needed to close said switch means.

References Cited

UNITED STATES PATENTS

| | | | |
|---|---|---|---|
| 2,836,734 | 5/1958 | Cichanowicz | 307—88.5 |
| 2,962,551 | 11/1960 | Johannesen | 179—15 |
| 3,089,963 | 5/1963 | Djorup | 179—15 |

JOHN W. CALDWELL, *Acting Primary Examiner.*

R. L. GRIFFIN, *Assistant Examiner.*